(No Model.)
C. S. COX.
RAISIN SEEDER.
No. 596,362. Patented Dec. 28, 1897.
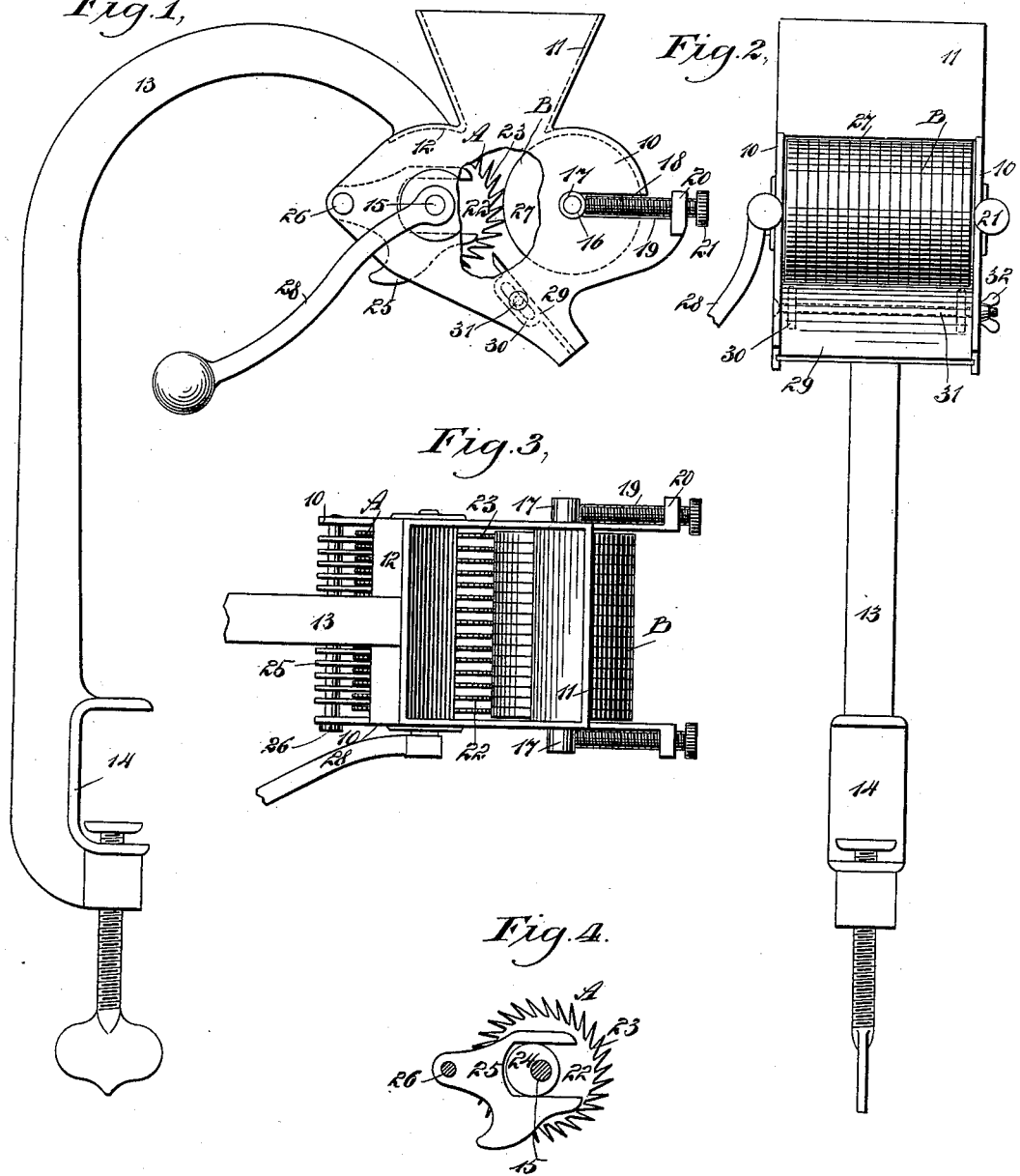
WITNESSES:
Edward Thorpe
J. Fred Acker
INVENTOR
C. S. Cox.
BY
[signature]
ATTORNEYS.

UNITED STATES PATENT OFFICE.

CARY S. COX, OF FRESNO, CALIFORNIA, ASSIGNOR OF ONE-HALF TO LEE L. GRAY, OF SAME PLACE.

RAISIN-SEEDER.

SPECIFICATION forming part of Letters Patent No. 596,362, dated December 28, 1897.

Application filed April 15, 1897. Serial No. 632,227. (No model.)

*To all whom it may concern:*

Be it known that I, CARY S. COX, of Fresno, in the county of Fresno and State of California, have invented a new and useful Improvement in Raisin-Seeders, of which the following is a full, clear, and exact description.

The object of my invention is to provide a hand raisin-seeder which will be simple, durable, and economic in its construction and which may be readily attached to any convenient support.

Another object of the invention is to construct a raisin-seeder which will comprise but very few parts and which will effectually and quickly extract the seeds from raisins and deliver the seeded raisins into the desired receptacle, discharging the seeds into a separate receptacle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved raisin-seeder, a portion of the frame being broken away. Fig. 2 is a front elevation of the raisin-seeder. Fig. 3 is a plan view of the body portion of the seeder; and Fig. 4 is a section through the saw or carrying-roll, illustrating the application thereto of stripping-arms.

The frame of the seeder consists of two side pieces 10, which support a hopper 11 at their upper central portion, the hopper being usually made integral with the side pieces. A cross-bar 12 extends from one side piece to the other at the rear of the hopper 11, and a supporting-arm 13 is attached to this side piece or made integral therewith, the supporting-arm being curved upwardly and rearwardly and then carried downwardly, terminating at its lower end in a clamp 14 of any approved type.

Below the hopper near the rear of the frame a shaft 15 is journaled, and a second and preferably horizontally-alining shaft 16 is located near the front of the machine at the opposite side of the hopper, the shaft 16 being held to turn in bushings 17, which are loosely placed in slots 18, made in the side pieces of the frame. The shaft 16 is adjustable toward the shaft 15 through the medium of screws 19, which engage with the bushings 17 and are passed through threaded apertures made in the lugs 20, located at the front edge of the side pieces, the adjusting-screws terminating at their outer ends in heads 21, preferably milled.

The saw or carrying-roll is mounted on the rear shaft 15. This roll consists of a series of disks 22, which are secured to the shaft 15, each disk being provided with peripheral teeth 23, inclined in a direction opposite the direction of the motion of the shaft, and the said teeth are either given a sharp inclination or are curved or crooked. The disks 22 are spaced through the medium of eccentric washers 24, secured on the shaft 15. Stripping-arms 25 are provided at the rear of each cam-washer 24. These stripping-arms are pivoted at their rear ends upon a fixed shaft 26, extending from one side piece of the frame to the other, and the front ends of the stripping-arms are bifurcated and their members so spaced that their inner faces will engage with the peripheral surfaces of the cam-washers near which they are placed, as is particularly shown in Fig. 4.

The saw or carrying-roll operates in conjunction with an elastic roll B. This roll comprises a series of disks 27, closely grouped and constructed of rubber or a like material, the disks being secured in any suitable or approved manner upon the shaft 16. The shaft 15 may be revolved by any suitable means, but usually a crank 28 is secured to one end of the shaft for that purpose, as illustrated. A knife 29 is provided for removing seed that may cling to the teeth 23 and for conducting the seeds, as they drop from the elastic roll, out, preferably to the front portion of the frame. The knife 29 is adjustable to and from the saw or carrying-roll, being held to slide in grooves made in the inner faces of the sides of the frame. The knife or blade is also provided upon its under face with elongated eyes 30, through which the adjusting-shaft 31 is passed, and likewise through the side pieces of the frame, the adjusting shaft or screw having a head at one end, being threaded at the opposite end to receive a lock-nut 32 or its equivalent.

In operation the raisins to be seeded are placed in the hopper 11. The raisins thereupon drop down to the point where the teeth of the saw or carrying-roll engage with the periphery of the elastic roll. The teeth as they travel downward force the seed from the raisins, which drop upon the knife or blade 29 and slide down the upper surface thereof, the knife likewise serving to detach from the teeth any seeds that may cling thereto. The raisins are stripped from the carrying-roll by reason of the vertical movement of the stripping-arms 25, which movement is imparted to said arms by their engagement with the cam-washers 24.

Having thus described my invention, I claim as new and desire to secure by Letters Patent—

1. In a raisin-seeder, a carrying-roll, consisting of a shaft, disks secured upon the shaft having teeth inclined in a direction opposite the direction of motion, a pressure-roll, having an elastic surface arranged to engage with said teeth at a point in the revolution of the carrying-roll, reciprocating strippers located between the toothed disks, and a blade adjustable to and from the teeth of the carrying-roll adapted to remove seed from said teeth.

2. In a raisin-seeder, a carrying-roll consisting of a shaft, disks secured upon the shaft, having teeth set at an incline to the radius, and an elastic roll engaging with the said inclined teeth at one point in the revolution of the carrying-roll, and strippers held to reciprocate upon the carrying-roll adjacent to its teeth, as and for the purpose specified.

3. In a raisin-seeder, a carrying-roll consisting of a series of disks having their teeth inclined in a direction opposite to the direction of motion, a support for the disks, cam-washers located between the disks, revolving with them, and strippers operated by the cam-washers, as and for the purpose specified.

4. In a raisin-seeder, the combination, with a frame having a hopper, and a roll having an elastic face, located below the hopper, of a carrying-roll consisting of a shaft, disks secured upon the shaft, having peripheral teeth inclined in a direction opposite to the direction of motion, cam-washers secured on the shaft between the disks, and stripping-arms pivoted in the said frame, an arm being provided for each cam-washer, and the front ends of the arms being bifurcated to receive the said cam-washers, as and for the purpose specified.

5. The combination of a shaft, toothed disks mounted thereon, cams located between the disks and turning with the shaft, and swinging stripping-arms mounted independently of the shaft and engaged by the cams.

CARY S. COX.

Witnesses:
L. L. GRAY,
THOS. H. LYNCH.